United States Patent [19]

Picard

[11] Patent Number: 5,165,713
[45] Date of Patent: Nov. 24, 1992

[54] FIFTH WHEEL COVER

[75] Inventor: Gilles N. Picard, William's Lake, Canada

[73] Assignee: 5th Boot Industries Inc., Maple Ridge, Canada

[21] Appl. No.: 725,458

[22] Filed: Jul. 3, 1991

[51] Int. Cl.⁵ .............................................. B62D 53/08
[52] U.S. Cl. .................................................... 280/433
[58] Field of Search ............................... 280/433, 432

[56] References Cited

U.S. PATENT DOCUMENTS

| | | | |
|---|---|---|---|
| 3,924,909 | 12/1975 | Kent et al. | 280/433 |
| 4,169,635 | 10/1979 | Szalay et al. | 280/433 |
| 4,457,531 | 7/1984 | Hunger | 280/433 |
| 4,542,912 | 9/1985 | St. Louis | 280/433 |
| 4,805,926 | 2/1989 | Mamery | 280/433 |
| 4,946,184 | 8/1990 | Larocco | 280/433 |

FOREIGN PATENT DOCUMENTS 0117319 9/1984 European Pat. Off. ............ 280/433

OTHER PUBLICATIONS

Holland Service Bulletin No. 4A dated Dec. 15, 1988 entitled "Fifth Wheel Lube Plates Installed on Fifth Wheels".

Primary Examiner—Mitchell J. Hill
Attorney, Agent, or Firm—John Russell Uren

[57] ABSTRACT

A fifth wheel cover (10) comprises a substantially sheet-like member having a circular portion (12) and a pair of tail portions (14) extending from one side of the circular portion (12) for covering the bearing plate and sloped flanges of the fifth wheel. A central kingpin opening (16) is provided between the tail portions (14). A cup portion (18) is provided at the end of each tail portion (14) for receiving the rear ends of the sloped flanges therein. At least one hook formation (20) is provided on the side of the circular portion (12) opposite the tail portions (14) for engaging with the rim of the fifth wheel to secure the cover (10) on the fifth wheel. The cover is integrally moulded from an anti-friction synthetic plastic material.

5 Claims, 3 Drawing Sheets

FIFTH WHEEL COVER

FIELD OF THE INVENTION

This invention relates to a fifth wheel cover. In particular, it relates to an anti-friction cover for a fifth wheel.

BACKGROUND OF THE INVENTION

A fifth wheel on a tractor is provided for hitching a trailer to the tractor. It comprises a bearing plate located in a horizontal position with two flanges extending rearwardly of the tractor and sloped downwards towards the back to enable the tractor to slide underneath the trailer. A downwardly extending kingpin is provided on the trailer to engage with the central kingpin opening on the bearing plate which is located between the flanges. The trailer has a flat bearing surface on its underside around the kingpin to match the bearing surface of the bearing plate on the tractor. Lubrication is provided between the bearing surfaces. Although grease has been used for this purpose, the use of a Teflon plate attached to the bearing plate, such as described in U.S. Pat. No. 4,542,912, has been proposed. However, this method suffers from the disadvantage that the installation thereof is time-consuming. A further disadvantage is that holes need to be drilled in the bearing plate to install the Teflon plate. This causes weakening of the bearing plate. The thickness of the Teflon plate also causes problems due to the fact that the kingpin is, in some instances, not long enough to accommodate the plate between the bearing surfaces. This can cause breakage of the attachment.

It is accordingly an object of the present invention to provide a fifth wheel cover which is easy to instal and does not require the drilling of holes into the bearing plate surface.

SUMMARY OF THE INVENTION

According to the invention there is provided a fifth wheel cover comprising a substantially sheet-like member having a circular portion and a pair of tail portions extending from one side of the circular portion for covering the bearing plate and sloped flanges of a fifth wheel of a tractor, and a central kingpin opening between the tail portions, and wherein a cup portion is provided at the end of each tail portion for receiving the rear ends of said sloped flanges therein, and at least one hook formation on the side of the circular portion opposite the tail portions is provided for engaging with the rim of the fifth wheel to thereby secure the cover on the fifth wheel, said circular and tail portions and said cup and hook formations being integrally moulded from an anti-friction synthetic plastic material.

Further objects and advantages of the invention will become apparent from the description of a preferred embodiment of the invention below.

BRIEF DESCRIPTION OF THE DRAWINGS

The invention will now be described by way of an example with reference to the accompanying drawings, in which.

DESCRIPTION OF PREFERRED EMBODIMENT

Figure 1:
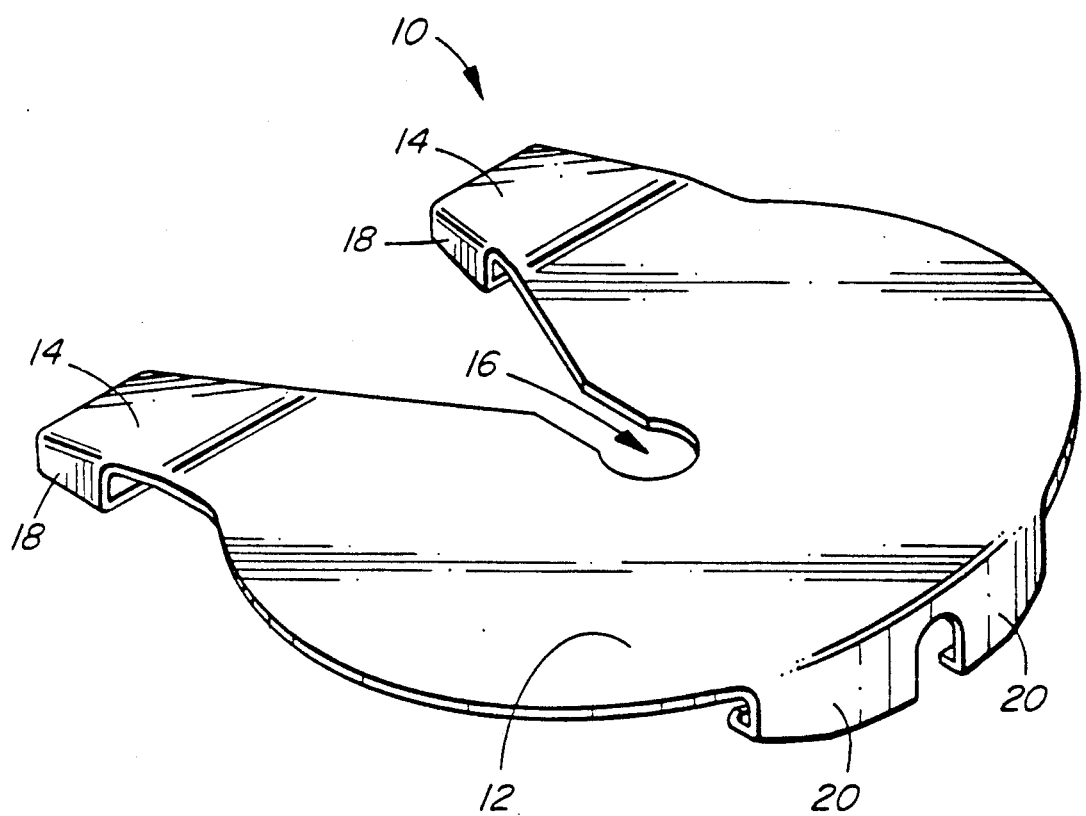
FIG. 1 is a three-dimensional view of a fifth wheel cover according to the invention.
Figure 2:
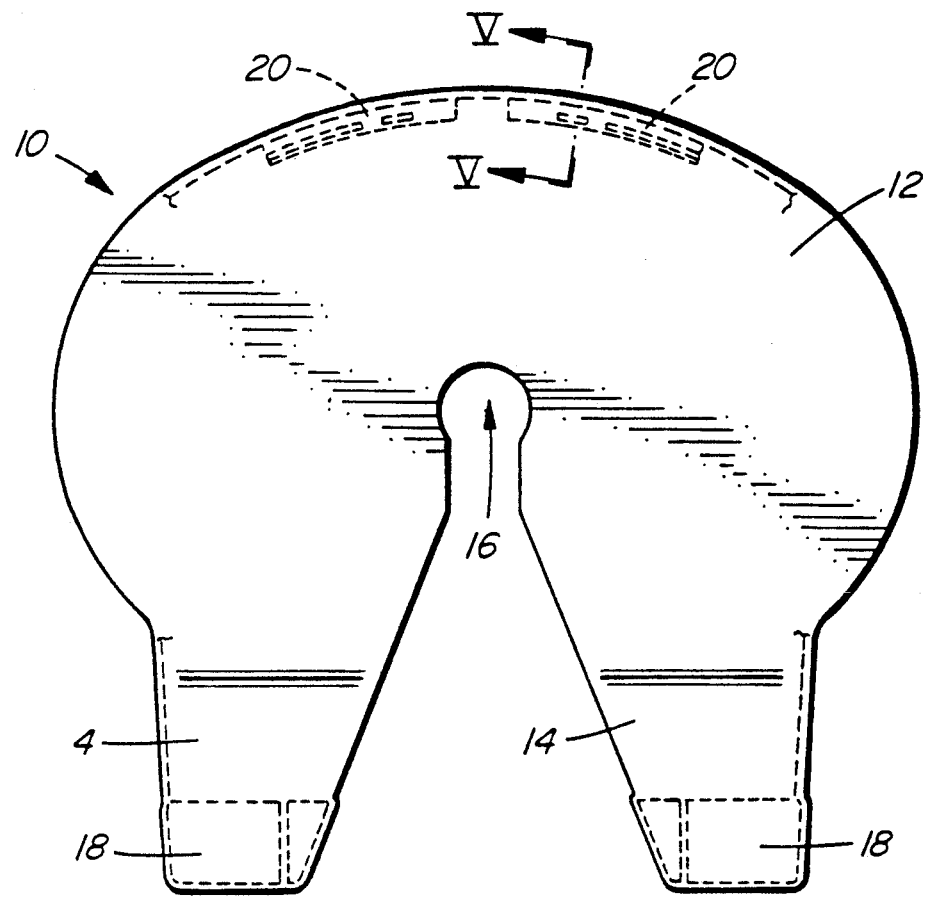
FIG. 2 is a plan view of the cover of FIG. 1.
Figure 3:
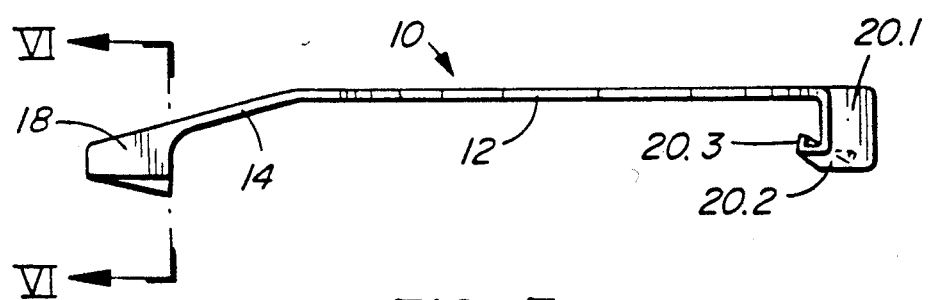
FIG. 3 is a side view of the cover of FIG. 1.
Figure 4:
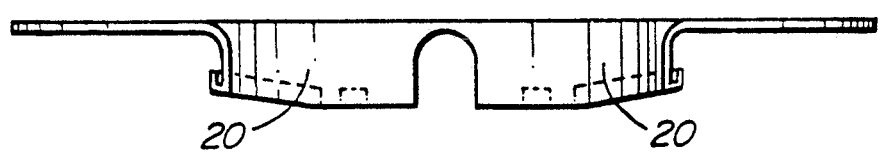
FIG. 4 is a fractional side view of the cover showing details of hook formations thereon.
Figure 5:
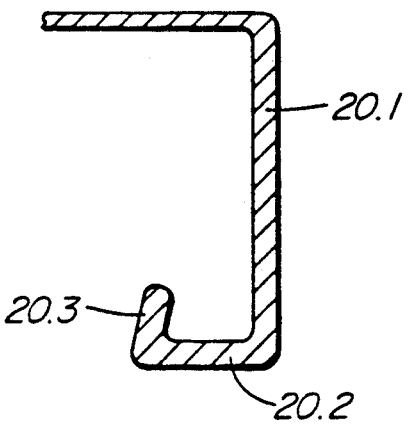
FIG. 5 is a section taken along the lines V—V in FIG. 2.
Figure 6:
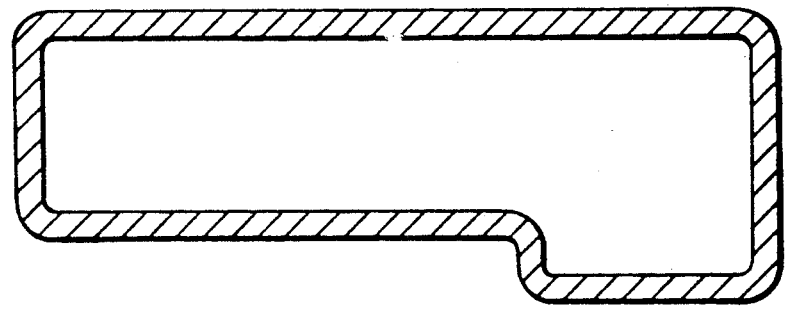
FIG. 6 is a section taken along the lines VI—VI in FIG. 3.

In the drawings, reference numeral 10 generally indicates a fifth wheel cover which is in the form of a sheet-like member having a circular portion 12 and a pair of tail portions 14 extending from one side of the circular portion 12 for covering the bearing plate and sloped flanges of a fifth wheel. A central kingpin opening 16 is provided between the tail portions 14. A cup formation 18 is provided at the end of each tail portion 14 for receiving the rear ends of the sloped flanges of the fifth wheel therein. A pair of hook formations 20 is provided opposite the tail portions 14 for engaging with the rim of the fifth wheel to secure the cover 10 in position on the fifth wheel. The hooks are symmetrically arranged with respect to the kingpin opening 16 and each hook formation 20 comprises a downwardly extending portion 20.1 for seating against the outer periphery of the fifth wheel bearing plate, and inwardly extending portion 20.2 for contacting the underside rim of the bearing plate and an upwardly extending lip portion 20.3 for seating against the inner side of the bearing plate rim.

The cover 10 is moulded from an anti-friction synthetic plastic material, such as polyurethane, nylon or a polycarbonate.

The thickness of the circular portion is about ⅛ inch thus avoiding an excessive thickness which could interfere with the proper operation of the fifth wheel attachment.

In use, the cover 10 is placed over the fifth wheel without any time consuming installation or hole drilling being required. The cup formations 18 of the tail portions 14 are engaged with the flanges of the fifth wheel attachment and thereafter the hook formations 20 are engaged with the rim of the bearing plate on the opposite side of the tail portions.

While only a preferred embodiment of the invention has been described herein in detail, the invention is not limited thereby and modifications can be made within the scope of the attached claims.

What is claimed is:

1. A fifth wheel cover comprising a substantially sheet-like member having a circular portion and a pair of tail portions extending from one side of the circular portion for covering the bearing plate and sloped flanges of the fifth wheel, and a central kingpin opening between the tail portions, a cup portion being provided at the end of each tail portion for receiving the rear ends of said sloped flanges therein, and at least one hook formation on the side of the circular portion opposite the tail portions for engaging with the rim of the fifth wheel to thereby secure the cover on the fifth wheel, said circular and tail portions and said cup and hook formations being integrally moulded from an anti-friction synthetic plastic material.

2. The fifth wheel cover according to claim 1, wherein the synthetic plastic material is selected from a group consisting of polyurethane, nylon and a polycarbonate.

3. The fifth wheel cover according to claim 2, wherein the hook formation comprises a downwardly extending portion for seating against the outer periphery of the fifth wheel bearing plate and an inwardly extending portion for contacting the underside rim of the bearing plate and an upwardly extending lip portion for seating against the inner side of the bearing plate rim.

4. The fifth wheel cover according to claim 3, wherein a pair of said hook formations is provided, the hook formations being arranged symmetrically with respect to said central king pin opening.

5. The fifth wheel cover according to claim 4, wherein the covered portion is about ⅛ inch thick.

* * * * *